United States Patent
Cochran, Jr. et al.

(10) Patent No.: US 6,582,651 B1
(45) Date of Patent: Jun. 24, 2003

(54) METALLIC ARTICLES FORMED BY REDUCTION OF NONMETALLIC ARTICLES AND METHOD OF PRODUCING METALLIC ARTICLES

(75) Inventors: Joe Kennedy Cochran, Jr., Marietta, GA (US); Kon Juin Lee, Lawrenceville, GA (US); Thomas H. Sanders, Jr., Atlanta, GA (US)

(73) Assignee: Geogia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/591,160

(22) Filed: Jun. 9, 2000

Related U.S. Application Data
(60) Provisional application No. 60/138,970, filed on Jun. 11, 1999, and provisional application No. 60/139,077, filed on Jun. 11, 1999.

(51) Int. Cl.[7] .............................. B22F 1/00; B22F 3/10; B22F 7/02
(52) U.S. Cl. ................ 419/5; 419/8; 419/36; 419/41; 419/45; 419/54
(58) Field of Search .................. 419/8, 53, 54, 419/41, 45, 36, 5

(56) References Cited

U.S. PATENT DOCUMENTS

| | | | | |
|---|---|---|---|---|
| 3,762,920 A | * | 10/1973 | Singer et al. | 75/208 R |
| 3,994,716 A | * | 11/1976 | Huppmann et al. | 75/0.5 BB |
| 4,389,258 A | * | 6/1983 | Dickson et al. | 148/3 |
| 4,770,702 A | | 9/1988 | Ishigaki et al. | 75/244 |
| 4,822,410 A | * | 4/1989 | Matovich | 75/0.5 B |
| 4,851,038 A | | 7/1989 | Sakamoto et al. | 75/5 |
| 5,417,917 A | | 5/1995 | Takahar et al. | 419/2 |
| 5,698,007 A | | 12/1997 | Schmitt | 75/772 |
| 5,731,272 A | | 3/1998 | Tanaka et al. | 508/133 |
| 5,774,779 A | * | 6/1998 | Tuchinshiy | 419/2 |
| 5,885,521 A | | 3/1999 | Meissner | 266/79 |
| 6,015,527 A | | 1/2000 | Kamei et al. | 266/145 |
| 6,036,744 A | | 3/2000 | Negami et al. | 75/503 |

* cited by examiner

Primary Examiner—Daniel J. Jenkins
(74) Attorney, Agent, or Firm—Thomas, Kayden, Horstemeyer & Risley, LLP

(57) ABSTRACT

A process for forming a shaped metallic article, including the steps of combining the starting materials, forming the starting materials into a shape to produce a nonmetallic metal precuror article of a certain geometry, and converting the nonmetallic article to a metallic article by reduction or decomposition, while substantially retaining the geometry of the nonmetallic article. The forming step in which the starting materials are fabricated into a shape can include extrusion, dry pressing, or slurry casting. Further, another embodiment is a metallic article produced by converting a nonmetallic article with a certain geometry, including a plurality of open-ended channels, substantially to the same geometry as the nonmetallic article from which it was converted.

67 Claims, 5 Drawing Sheets

METALLIC ARTICLES FORMED BY REDUCTION OF NONMETALLIC ARTICLES AND METHOD OF PRODUCING METALLIC ARTICLES

CLAIM OF PRIORITY

This application claims priority to copending U.S. provisional applications entitled, "Forming Metal Articles By Direct Reduction of Extruded Non-Metal Articles With a Multiple of Open-Ended Channels," having Ser. No. 60/138,970, filed Jun. 11, 1999 and "Ordeed [sic] Metallic Structures By Direct Reduction of Pressure Consolidated Non-Metallic Arti [sic] Articles", having Ser. No. 60/139,077, filed Jun. 11, 1999, which are entirely incorporated herein by reference.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Contract No. N00014-96-C-0400, and Grant No. N0001497-1-0492 awarded by the Office of Naval Research of the United States.

TECHNICAL FIELD

The present invention is generally related to metallic articles and, more particularly, is related to a method for forming metallic articles from non-metallic articles.

BACKGROUND OF THE INVENTION

The process of producing metals by direct reduction of non-metal oxides is well known in the art.

Conversion to Metal by Direct Reduction:

The direct reduction (DR) process produces metal directly from metal-bearing ores or oxides by removing the associated oxygen or other anions at temperatures below the melting temperature of any of the materials involved in the process. Iron, for example, has been produced in this manner prior to the invention of blast furnace, in which iron is melted and reduced with carbon and withdrawn as a liquid, molten metal. Direct-reduced iron (DRI) is normally produced in the form of lumps or agglomerates due to extremely high volume shrinkage (53.4%) and weight loss (30%). Numerous phase changes are also present in the course of reaction, which causes additional movement of atoms in the substance. Whether the product maintains its original shape or its structural integrity has not been a concern to any degree because DRI is solely used as substitution for steel scrape to boost production rate of other steel-making processes in either a blast furnace or an electric arc furnace.

Direct reduction of a metal oxide requires energy in the presence of suitable reducing agents. Common reductants for iron as an example include, but are not limited to hydrogen, carbon monoxide, methane, coal gas, fuel oils, coal, coke, etc. The reducing agent reacts with oxygen and forms water molecules, which are then removed from the system. It is a well known that the reaction rate will increase as the concentration of reactants increases and decrease as the concentration of reaction products increases (Le Chatelier's Principle). The reaction rate is a strong function of the available concentration of reactants, both the metal oxide and reducing agent; the concentration of reaction products (water vapor); and temperature.

Metals can also be produced from other non-metallic metal precursor materials such as hydrides. In this case, metal hydrides such as titanium hydride can be chemically converted to the metal by heating the metal hydride to a high enough temperature to decompose the hydride. For titanium hydride the decomposition temperature is approximately 600° C. Above the decomposition temperature, the titanium hydride separates into titanium and hydrogen gas. At higher temperatures, the titanium powder can be consolidated to a dense metal by solid state sintering. This process also applies to hydrides of vanadium and zirconium.

Shape Fabrication:

Fabricating nonmetallic articles with a specific geometry from nonmetallic metal precursors is well known in the art. Various methods of shape fabrication of nonmetallic articles are outlined below.

a. Dry Pressing

The most common method that can be used to consolidate powders as starting materials into a useful shape is "dry pressing," which is a traditional forming process. Although the name includes "dry" as a modifier, the starting materials usually contain a few percent by weight of moisture to differentiate from wet or semi-wet pressing, such as the "stiff mud" process. The basic dry pressing process involves applying the pressure uniaxially. If pressure is applied from all directions, or isostatically, then the process is called "isostatic pressing." Whether the pressure is to be applied uniaxially, biaxially or isostatically, the decision is largely dependent upon the property requirements and manufacturing economics.

Uniaxial pressure fabrication is a very common forming process. It is used to form many tiles and other flat shapes, as well as simple shapes such as disks or cylinders. The cross-sections that can be formed are usually fairly simple geometrically, although the pressed shapes can be machined into more complex geometries. A large number of holes can be made to the pressed parts with the aid of inserts. The height is usually limited relative to the lateral dimension or diameter. Pressing of floor tile is one example of a dry pressing process that has been highly automated.

b. Slip Casting:

Conventional slip casting is a process for forming articles with a suspension of ceramic powders. Water is usually used as the liquid medium although some nonaquous solvents have been used in certain situations.

c. Pressure Casting

Pressure slip casting is basically the same process but with pressure applied to the slip in the mold. Pressure casting is being applied in the sanitary ware industry and has produced a number of advantages. Casting times are significantly cut and parts can be easily demolded. Molds usually require no drying between casting cycles and thus can be returned to service immediately, as an air purging system is used to de-water molds. Mold life is much longer than conventional plaster molds, and fewer defects occur because of mold wear. Moreover, product quality is more consistent and the cast part has less moisture to remove. This eases drying requirements and cuts drying defects and losses. Parts with variable thickness are easier to mold. One person can operate two or three casting machines, including fettling of parts, and the operation can be run two or three shifts per day. The net result is greater throughput, lower labor costs, and lower overall production costs.

d. Centrifugal Casting:

Centrifugal slip casting is another means of increasing pressure at the casting face, but with lower pressure than in the pressure casting process.

e. Gel Casting:

Gel casting is a recently developed technique for water and is currently being used to form complex shape ceramic rotors for automotive turbochargers.

f. Slurry:

There are multiple casting slip properties that are desirable to allow an optimum process. These properties include: 1) low viscosity, i.e., high flow rates, to allow all parts of the mold to be easily filled and to prevent trapping of air bubbles; 2) high specific gravity to shorten casting time, increase green density, lower drying shrinkage, and lower the amount of water that must be processed; 3) good casting rate; 4) easy mold release; 5) adequate draining behavior from the mold at the end of the cast; and 6) sufficient green strength in the cast layer to allow ease of handling.

g. Extrusion

Extrusion can be a very effective and efficient method of forming material continuously or semi-continuously using relatively simple equipment. The advantages of extrusion as a forming and consolidation process have been recognized and utilized by manufacturers of nearly all materials. If a material can be melted, softened, or mixed into a plastic state so that it can be forced through a die, then it can be and probably has been extruded.

In terms of material and energy conservation, the net shape and continuous forming capabilities of the extrusion process are very attractive. Extrusion has been used for many years in the clay/porcelain industries. More recently, it has been used with fine, technical ceramics such as silicon carbide, silicon nitride, and oxide materials. Shape capability has also expanded greatly, from simple rods and tubes to complex profiles, sheets/films, and honeycombs.

Extrusion has limitations and cannot be used to make all products. It is best suited to fabricate shapes that are of a constant cross section and can be linearly formed. Typical products formed by extrusion are: tubes or pipes, with either open or closed ends; profiles of numerous shapes; rods; honeycombs; plates (solid, hollow, or ribbed); and films.

It has been heretofore unknown how to use the above prior art shape fabrication methods to achieve metallic articles. Further, due to problems with controlling the reduction reactions, the method of producing metallic articles by direct reduction has been limited in the prior art to basic forms, i.e., flat sheets. What is desired, but has been heretofore unaddressed in the prior art is a method of producing metallic articles of intricate or varied geometrical shapes that possess high transverse strength.

SUMMARY OF THE INVENTION

The present invention provides a method for producing metallic articles by direct reduction of metallic oxide articles or decomposition of metal hydride articles. Briefly described, the process for forming a shaped metallic article includes the steps of combining starting materials, which include non-metallic metal precursor powder(s), a binder, and a solvent, forming the starting materials into a shape to produce a nonmetallic article of a certain geometry, and converting the nonmetallic article to a metallic article with a reducing agent or thermal decomposition., while substantially retaining the geometry of the nonmetallic article.

The present invention can also be viewed as providing a method for producing a shaped metallic article wherein the forming step includes extruding the non-metallic metal precursor powder article into a shape. Further described, the extrusion process includes the steps of forming the starting materials into a paste, extruding the paste into a non-metallic metal precursor powderarticle with a certain geometry, drying the metal precursor article, removing the binder from the nonmetallc article, reducing and/or decomposing the non-metallic article to a metallic article while substantially retaining the geometry of the metallic oxide article, sintering the metallic article to form a more dense metallic article, and heat treating the dense metal shape.

The present invention can also be viewed as providing a method for producing a shaped metallic article wherein the shape fabrication process includes dry pressing of the metal precursor article. In this regard, the method can be broadly summarized by the following steps: spray-drying the starting materials to form a pressing powder, dry-pressing the pressing powder, delivering the pressing powder into a die cavity to form a nonmetallic article, and then subjecting the nonmetallic article to a direct reduction process.

The present invention can further be viewed as providing a method for forming and nonmetallic article by a slurry forming process. In this regard, the slurry forming process can be broadly summarized by the following steps: forming a slurry of the starting materials, mixing the slurry, casting the slurry to produce a nonmetallic article with a certain geometry, and then reducing the nonmetallic article to a metallic article with substantially the same geometry as the nonmetallic article.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
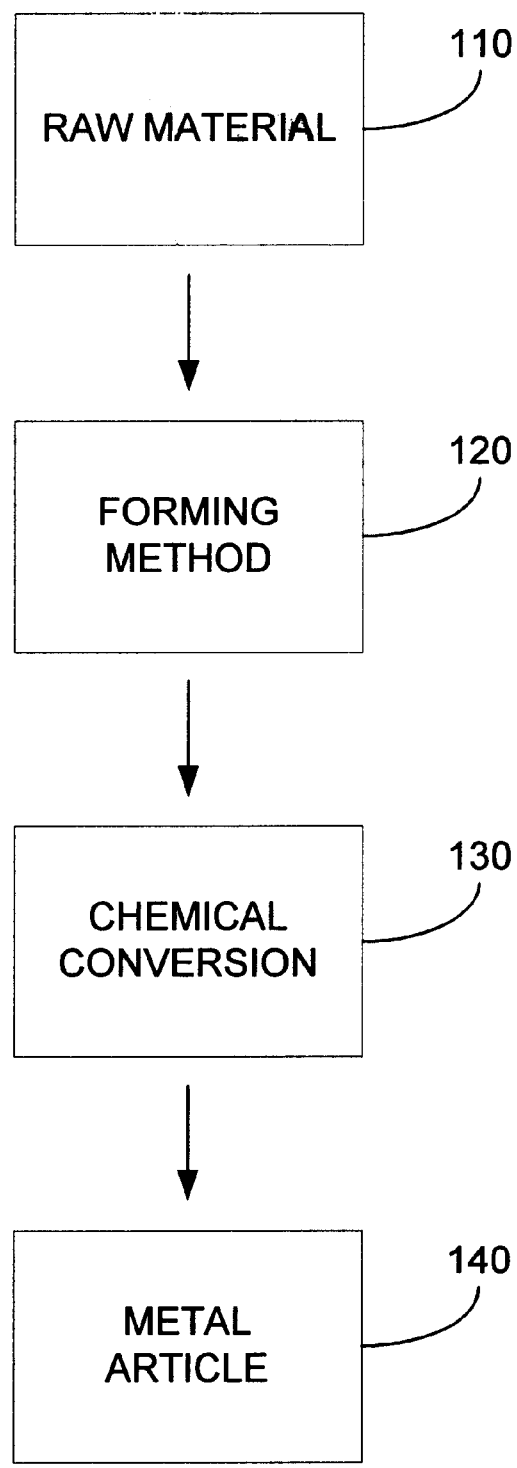
FIG. 1 is a flow chart of the overall process of the present invention.

The flow chart of FIG. 1 shows the process of the present invention, a method for producing shaped metallic articles. FIG. 1 represents the general process of the present invention. The raw material is combined in step 110. The raw material is then formed in step 120 by any one of the shape fabrication methods of dry pressing, slurry forming and extrusion processes. In step 130, the formed nonmetallic article is subjected to direct chemical conversion to produce the metallic article of step 140.

Any process descriptions or blocks in flow charts should be understood as representing modules, segments, or portions of the process which include one or more executable instructions for implementing specific steps in the process, and alternate implementations are included within the scope of the preferred embodiment of the present invention, as would be understood by those reasonably skilled in the art of the present invention.

a. Dry Pressing

Figure 2:
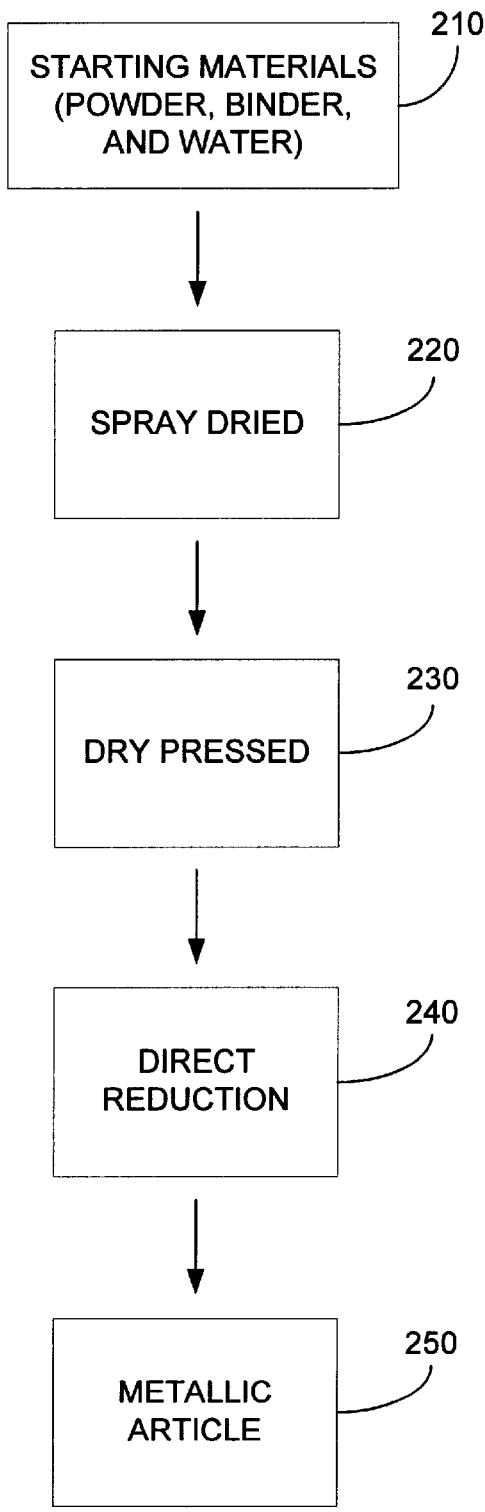
FIG. 2 is a flow chart of the dry pressing process in accordance with the forming method shown in FIG. 1.

FIG. 2 represents one possible embodiment of the present invention of FIG. 1, forming a nonmetallic article using dry pressing as the shape fabrication method.

The basic forming process is characterized by uniaxially pressing a powder material with a small amount of water or other liquid, approximately 1–7% by weight. A binder material is sometimes used in the composition to increase the "green strength," or pressed strength, of the part so it can be more easily handled in subsequent manufacturing processes. The binder phase contributes a small amount of plasticity, but this process is basically a non-plastic forming process.

Free-flowing pressing powder is then delivered to a die cavity, which consists of a rigid die cavity frame and moveable lower and upper die punches. The amount of material delivered to the die cavity is controlled by the depth of the cavity, which can be varied by moving the lower punch, and the bulk density of the pressing powder. It is highly desirable that the material be delivered in such a way that the cavity is filled fully and very uniformly.

Die fill is greatly enhanced and made much simpler if the pressing powder is freeflowing. For products such as tile and technical ceramics, spray dried pressing powder is ideal because of its flow properties and uniformity. In these industries, use of spray-dried powder has become nearly universal. It is also important that the particle size distribution of both the original raw materials and the pressing powder (they will be different for spray-dried pressing powders) be consistent with time. The green density of the pressed compact, as well as its uniformity, will depend on this. Pressed thickness will also depend on the bulk properties of the powder because of their influence on die fill and compaction.

It is desirable to maximize the bulk density of the pressing powder while still maintaining good flow. If the pressing powder has not been spray dried and has less than desirable flow properties, as is likely with refractory brick bodies, for example, control of die fill will be more difficult. Pressing speeds will likely have to be lower to allow good die fill.

In FIG. 2, at step 210 the starting materials, including a nonmetallic metal precursor powder, a binder, and water are combined. The water used in the starting materials is approximately 0–5% by weight of the starting materials. In step 220, the starting materials are then spray dried, and then dry pressed in step 230 to form a shaped nonmetallic article. In step 240, the nonmetallic article is subjected to direct reduction, producing the metallic article shown in step 250.

b. Slurry Process

Figure 3:
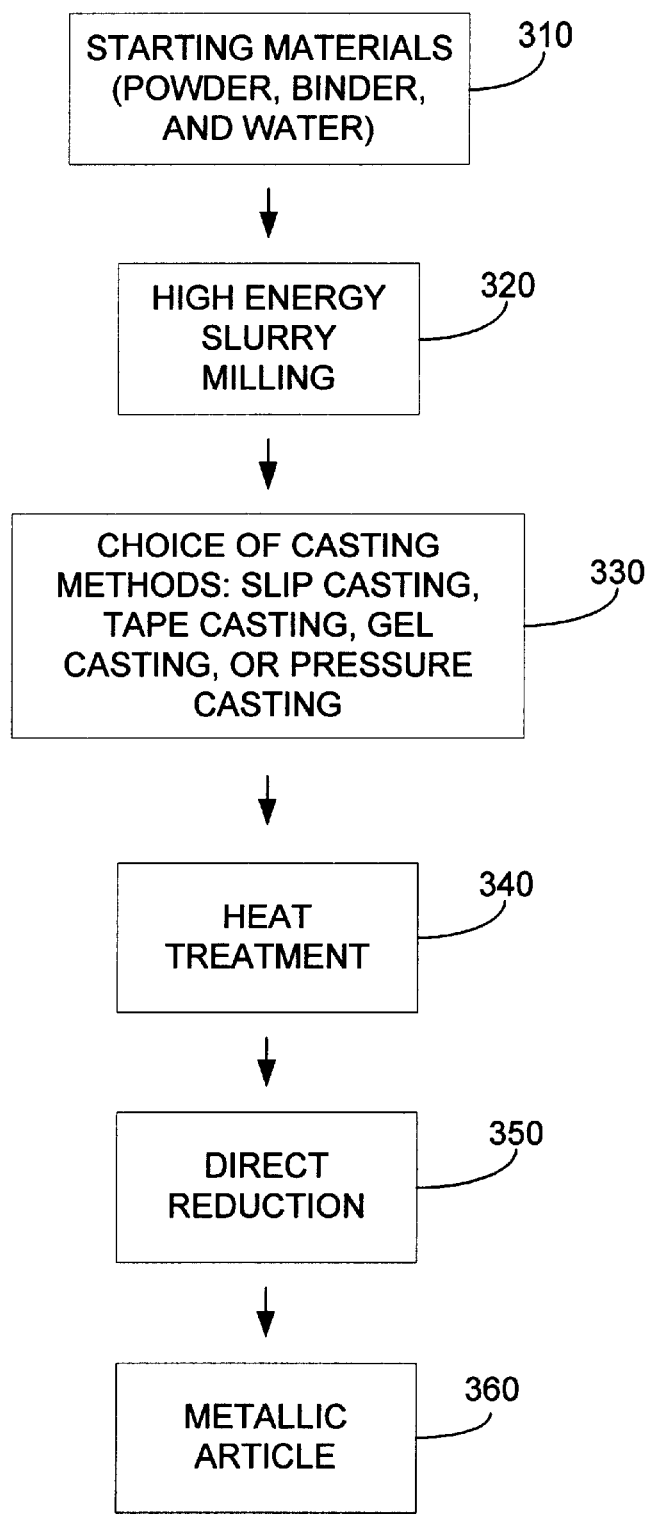
FIG. 3 is a flow chart of the dry pressing process in accordance with the forming method shown in FIG. 1.

FIG. 3 is another possible embodiment of the present invention of FIG. 1, fabricating a metallic article via the slurry forming shape fabrication method depicted in step 120 of FIG. 1. Casting slips, especially when the specific gravity is high and the body contains colloidal particles such as clays, tend to flocculate. To counter this, a variety of chemicals are used to deflocculate the slip, or break up these aggregates. The basic process is to add like charges to the particle surfaces so that they repel each other. This decreases viscosity and changes the flow characteristics to Newtonian flow where the viscosity is a constant, which is independent of slurry flow rate.

A number of deflocculation agents are in use, including sodium silicate (water glass), sodium carbonate, sodium salts of phosphoric acid, sodium carboxymethylcellulose (Na-CMC), poly(vinyl alcohol) (PVA), polyvinylpyrrolidone (PVP), and others. By way of a simplified explanation, deflocculants containing the sodium ($Na^+$) ion act to cause surface replacement of calcium ($Ca^{2+}$) ions on the particle surfaces. Since not enough $Na^+$ ions can find room on the surface, the particles are given a net negative charge and repel each other. A drawback of using deflocculants containing $Na^+$ ions is that the composition then contains a powerful fluxing agent, which may be detrimental to firing or final electrical properties. Organic deflocculants with low ash content leave no residue.

It is much easier to produce a stable casting slip for compositions containing clay minerals. They act as suspension agents and binders. They aid in achieving desirable flow characteristics. Producing a workable casting slip for bodies devoid of plastic materials like clay is more difficult. Alumina presents a good case in point. It is a dense material and is thus difficult to keep in suspension. A high alumina ceramic composition will have no clay, and if the alumina content must be very high, it will consist of nearly pure alumina. Materials like Na-carboxymethylcellulose (CMC) act as combined binders and deflocculants. As is typical for deflocculation curves, the addition of Na-CMC dramatically decreases viscosity (round dots), with a minimum at 0.35 wt % to 0.65 wt %. Above this level, viscosity again rises.

In FIG. 3, the starting materials, including a nonmetallic metal precursor powder, a binder, and water are combined in step 310. Water comprises approximately 30–40% by weight of the starting materials in this embodiment of the invention. In step 320, the starting materials are subjected to high energy slurry milling. Then in step 330, the nonmetallic article is cast using any one of several casting methods, i.e. slip casting, tape casting, gel casting, or pressure casting.

In slip casting, one of the choice of casting methods shown in step 330 of FIG. 3, the suspension, or casting slip, is poured into a plaster mold. Water is absorbed by the mold at its surface, resulting in the formation of a layer of material that is low enough in water content that the material will be self-supporting when the mold is removed. After a layer of proper thickness has formed, the remaining slip is poured or drained from the mold. The part is normally allowed to remain in the mold, for additional water removal by absorption and evaporation, until the part has become physically strong enough to be self-supportive. After the part is released from the mold, it is allowed to dry completely.

Pressure casting, shown in step 330 of FIG. 3, is similar to slip casting, except that pressure is applied to the slip in the mold. This helps force water from the slip through the part and into the mold. Increasing the applied slip pressure dramatically cuts the time required to develop wall thickness. Pressure casting preferably uses special molds and stronger mold materials that can withstand the applied pressure. Plaster molds usually cannot withstand pressures used, and special plastic materials have been developed. These materials must have high porosity, high mechanical strength, and good elasticity. The latter property is required to allow mechanical pressure to be used to provide a very tight seal around the periphery of the molds without cracking.

Pressure can be increased at the casting face by means of centrifugal casting, as depicted in step 330 of FIG. 3. In this case, a cylindrical plaster mold is rotated about its axis, and the centrifugal pressure aids in the casting process. The pressures are lower than in the pressure casting process described above, and the process has been used to produce parts with multiple layers of different compositions. The process is usually limited to forming free-standing shapes of relatively simple cylindrical geometry.

Finally, another type of casting method used in step 330 of FIG. 3 is gel casting. Gel casting forms solid articles by pouring powder slurries into complex molds and then gelling the entire casting by crosslinking a water soluble polymer that is dissolved in the liquid phase of the slurry. The casting can be dried to removed the water used in the starting materials of step 310 of FIG. 3.

After one of the various casting methods are used in step 330 of FIG. 3, the cast nonmetallic article is heat treated in step 340, followed by direct reduction in step 350 to form a metallic article shown in step 360.

Figure 4:
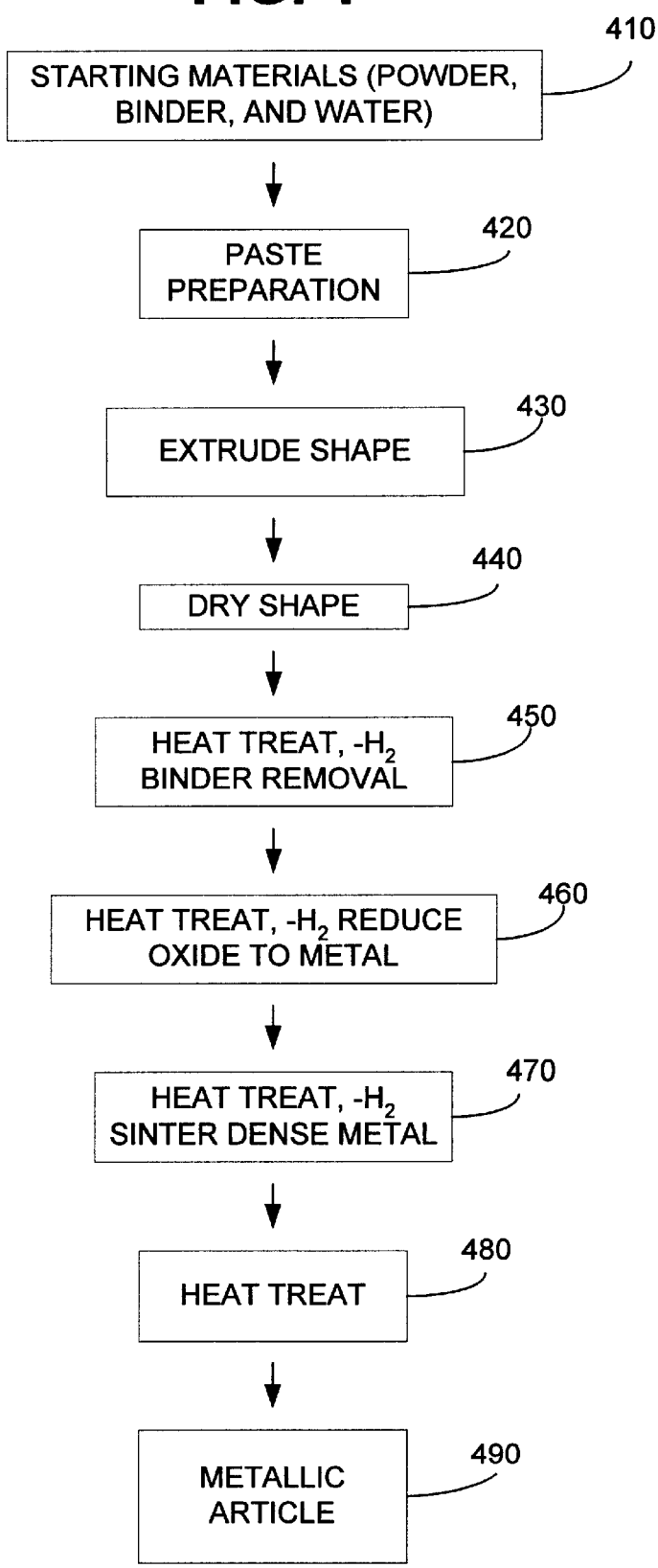
FIG. 4 is a flow chart of the dry pressing process in accordance with the forming method shown in FIG. 1.

FIG. 4 depicts yet another embodiment of the present invention of the forming step 120 of FIG. 1, forming a metallic article via extrusion. In extrusion, the material is melted, softened or mixed into a solid state, forced through a die and then extruded.

Extrusion can exhibit problems in the drying, binder removal, and firing operations. The binder and solvent that have been added to the mix must be either totally or partially removed in the drying process. This operation may be performed over a wide temperature range, depending on the characteristics necessary in the green (unfired) product to enhance green machining or firing. Generally, however, solvent/binder removal can result in the formation of cracks, laminations, and other flaws, and relatively large amounts of shrinkage can occur, disrupting dimensional stability and causing warpage. Drying problems can usually be solved by changes in processing and/or materials.

Firing problems also can cause defects that parallel those found in drying. Parts may need to be fixtured to maintain straightness, roundness, and cope with large dimensional shrinkage. This especially applies to large or long parts, where shrinkage can result in retained stresses, flaws, and difficulty in maintaining targeted tolerances. Again, most problems can be solved by following the proper process path and instituting process controls so that process predictability narrows the possible material/process choices that cause problems.

The choice of materials, equipment, and processing methods to produce a specific part are the keys to ensuring that the green extruded ware brought to the furnace is of the highest quality and has the necessary attributes to reduce risk of loss. In many fine ceramic processes, firing costs represent over 50% of the total cost to produce a part. It therefore makes sense to do everything possible to make the right green part, and thus greatly increase the chances of making the right fired part.

In step 410, the starting materials, including a metal oxide powder, a binder, and water are combined. In the extrusion process, water comprises approximately 20% by weight of the starting materials. In step 420, a paste of the starting materials is prepared, followed by extrusion of the shape in step 430. In step 440, the extruded shape is dried, followed by heat treatment in step 450 to drive off hydrogen and remove the binder. In step 460, the nonmetallic article is further heat treated to further drive off the hydrogen and reduce the nonmetallic article to a metallic article. In steps 470 and 480, the metallic article is subjected to further heat treatment in order to sinter the dense metal, thereby forming the shaped metallic article in step 490.

Possible nonmetallic precursor powders of the present invention that can be used to form the nonmetallic articles that are reduced to the metallic articles include hematite ($Fe_2O_3$) and other oxides, hydroxides, carbonates, nitrates, carbides, and nitrides of iron, cobalt, nickel, copper, molybdenum, chromium, niobium, manganese, and other metals. Other nonmetallic metal precursors which apply include but are not limited to hydrides, and specifically include titanium, vanadium, and zirconium hydrides. Possible binders that may be used in the present invention include but are not limited to cellulose derivatives (methylcellulose, hydroxyethylcellulose, hydroxypropoylmethylcellulose), alginates, gums, vinyls (polyvinyl alcohol), starches, acrylics, acrylamides, dextrins It is discovered in the present invention that mass transfer property through pressed articles with a multiple of openings greatly facilitates the conversion process. The openings provide an unrestricted passage of both the reducing agents to and the reaction products from the interior. The openness of the structure is deemed a very important feature for the article to survive the conversion process and emerge as a monolithic product. In addition to facilitation of reduction process, the ordered porosity can also impart certain desirable properties to the product, such as lower overall density, higher fluid permeability, tailorable stress-strain behavior.

In general, the requirement for the geometry is to have a high surface-to-volume ratio and a highly open access to the interior. Unlike other highly porous materials with random geometry, pressed perforated disks have a uniform and constant distribution of material. It is an important feature for direct reduction that more than usually involving high volume shrinkage. The constant web thickness or ligament diameter insures an equal coercion force to keep the material from separating or cracking, a phenomenon that will be dominant if two neighboring units are joined at the place with a minimal cross section.

It has been further demonstrated the importance of controlling the heating schedule and atmosphere control. From the starting material hematite ($Fe_2O_3$), to iron (Fe), the material will experience changes through magnetite ($Fe_3O_4$) and wustite (FeO). The phase transition from hematite to magnetite involves a contraction of 2.2% based on their respective theoretical density. However in actuality it also involves a temporary expansion of up to 20%, causing a detrimental stretching effect on the article. It is found that the harmful effect of this interim phase change can be alleviated either by the initiation of reduction at 1000° C. or by a vacuum-assisted conversion from hematite to magnetite at 500° C.

For reduction at temperatures below 900° C., the body is composed of loosely packed metallic grains that posses weak mechanic strength. This is because the temperature is too low for sintering to take place. It is well known that most chemical reactions, including the reduction of metal oxide at elevated temperatures, the higher the temperatures the higher the reaction rate. The higher reaction rate takes place at the expense of higher density gradient from exterior to interior. Some sintering is taking place simultaneously so the body has some strength against rupture or cracking. This is where the geometrical factor comes into play in conjunction with the chemical reaction. For geometry with obvious weakness, or a large fraction of minimal connecting area, the higher density gradient will cause the exterior surface, the higher density side, to crack.

A central issue related to the direct reduction process is the reducibility of the material involved. Using hydrogen as the reducing agents, the elements that can be reduced readily at below approximately 1350° C. are oxides of Fe, Co, Ni, Cu, Mo, Cr, Mn, Nb, etc., as predicted by thermodynamic data. Above 1450° C., melting and collapse of the pre-reduction article becomes dominant for a wide range of alloys having the aforementioned elements.

Some combination of the oxides has been found to produce a synergistic effect. For example, at the same temperature and furnace conditions where $Cr_2O_3$ can not be reduced, the mixture of $Fe_2O_3$ and $Cr_2O_3$ has been found to reduce completely. Similar effects have been found for niobium oxide, which can not be reduced at 1350° C. by itself, but has been found to form $Ni_3Nb$ in a mixture with NiO. But the net effect is the enabling of reduction of elements that are necessary and useful in a wide range of alloys. This represents discovery of an unusual effect that is not known to persons skilled in the art of direct reduction.

The ability to introduce an element in its oxide form has a cost advantage as well. Most oxides of transition elements are colorful and hence have been used for a long history as pigments, colorants, or inorganic dyes. Fine powders of these oxides are readily available as commodity at very low cost. The cost difference between a metal oxide and its metal counterpart, if and when it is available in powder form, is usually better than a 1:10 ratio.

The present invention provides a totally new approach to the fabrication of a low-density metal articles, in addition to high density articles. Due to the fine powder nature and low cost of raw materials used, the invention is found suitable for the economical production of such articles. It should be noted that included in the embodiment of the invention is the concept that articles which are free standing and unsupported are being fabricated in the shape forming step. This is different from replication fabrication processes whereby shapes are formed by coating substrates in some manner. For example, it is well known that reticulated foams of metals and non-metals are fabricated by applying a powder coating to a reticulated polymer foam using a slurry and that hollow spheres are made by spraying a powder coating onto spherical polymer cores. In both cases, the polymer substrate provides the support for forming the shape of the article and the support remains after the fabrication step. For the processes described here, the nonmetallic metal precursor article is free standing and self-supporting after the fabrication step.

Figure 5A:
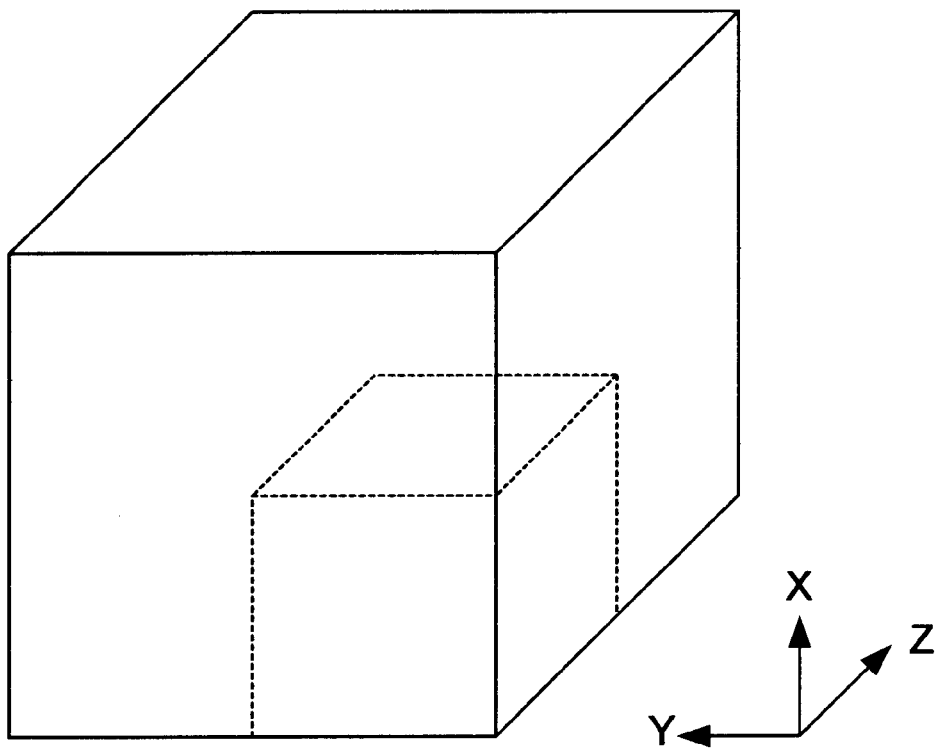
FIG. 5 is a perspective view of (a) nonmetallic article and (b) metallic article formed by the process of FIG. 1.
Figure 5B:
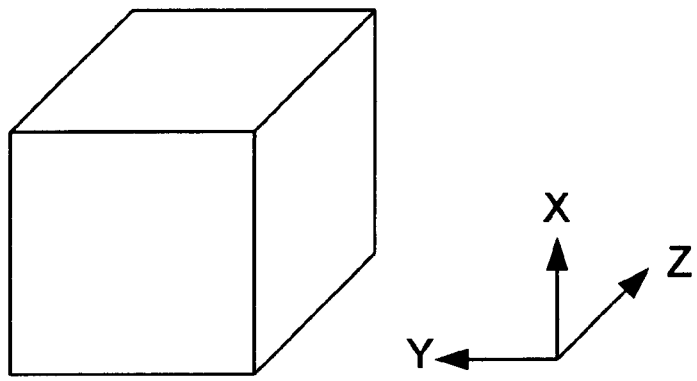

FIG. 5 depicts an articles produced by the process of the present invention. FIG. 5A shows a nonmetallic article produced in accordance with steps 110 and 120 of FIG. 1. FIG. 5B depicts a metallic article 140 of FIG. 1, produced by the chemical conversion step 130 of FIG. 1. It should be noted that the nonmetal article of FIG. 5A shrinks in three dimensions, along the x-, y-, and z-axes during the chemical conversion process to form the metal article of FIG. 5B that retains substantially the same geometry.

It should be emphasized that the above-described embodiments of the present invention, particularly any "preferred" embodiments, are merely possible examples of implementations, and are merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A process for forming a shaped metallic article, comprising the steps of:
    combining starting materials, the starting materials comprising a nonmetallic metal precursor powder;
    forming the starting materials into a free standing, unsupported shape to produce a nonmetallic article of a certain geometry;
    chemically converting the nonmetallic article to a metallic article with a reducing agent while substantially retaining the geometry of the nonmetallic article; and
    sintering the metallic article to form a more dense metallic article while substantially retaining the geometry of the nonmetallic article.

2. The process of claim 1, further comprising the step of drying the nonmetallic article.

3. The process of claim 1, wherein the starting materials further comprise a binder and a solvent.

4. The process of claim 1 wherein the nonmetallic metal precursor powder is converted to the metal by a decomposition process.

5. The process of claim 1, wherein the nonmetallic metal precursor powder comprises at least one of an oxide of iron, an oxide of cobalt, an oxide of nickel, an oxide of copper, an oxide of molybdenum, an oxide of chromium, an oxide of niobium, an oxide of manganese, an oxide of titanium, an hydride of vanadium, and a hydride of zirconium.

6. The process of claim 5, wherein the iron oxide comprises hematite.

7. The process of claim 1, wherein the nonmetallic metal precursor powder comprises a mixture of the nonmetallic metal precursor powders to form a metal article with a composition of a multiple of elements.

8. The process of claim 3, wherein the binder is organic.

9. The process of claim 8, wherein the organic binder comprises at least one of: cellulose derivatives, gums, starches, polyvinyl alcohols, alginates, acrylamides, and acrylics.

10. The process of claim 3, wherein the binder is inorganic.

11. The process of claim 10, wherein the inorganic binder comprises: nano-particle oxide gels.

12. The process of claim 3, wherein the solvent is water.

13. The process of claim 1, wherein the reducing step comprises: controlling reaction parameters of temperature, pressure, concentration of reactants and concentration of products.

14. The process of claim 1, wherein the reducing agent comprises at least one of: hydrogen, carbon monoxide, coal gas, fuel oils, carbon, and coke.

15. The process of claim 1, wherein the starting materials are formed into a shape by an extrusion process.

16. The process of claim 15, wherein the water comprises approximately 20 percent by weight of the starting materials.

17. The process of claim 1, wherein the nonmetallic metal precursor shape has multiple open-ended channels.

18. The process of claim 1, wherein the nonmetallic metal precursor geometry has multiple open-ended channels around the circumference of the shape and an interior core that is absent of material.

19. The process of claim 1, wherein the nonmetallic metal precursor geometry is in the form of a honeycomb.

20. The process of claim 15, wherein the extrusion process comprises the steps of:
    extruding the paste into a nonmetallic metal precursor article with a certain geometry;
    drying the nonmetallic metal precursor article;
    removing the binder from the nonmetallic metal precursor article;
    reducing the nonmetallic metal precursor article to a metallic article while substantially retaining the geometry of the nonmetallic metal precursor powder article;
    sintering the metallic article to form a more dense metallic article;
    heat-treating the dense metal shape.

21. The process of claim 20, wherein the removing of the binder step comprises heating the nonmetallic metal precursor powder.

22. The process of claim 20, wherein the nonmetallic metal precursor powder article is heated to 300–700° C. in order to remove the binder.

23. The process of claim 20, wherein the solvent comprises approximately 20% by weight of the starting materials.

24. A process for forming a shaped metallic article, comprising the steps of:
  combining starting materials, the starting materials comprising a nonmetallic metal precursor powder;
  forming the starting materials into a free standing, unsupported shape to produce a nonmetallic article of a certain geometry, wherein the starting materials are formed into a shape by a dry pressing process;
  chemically converting the nonmetallic article to a metallic article with a reducing agent while substantially retaining the geometry of the nonmetallic article; and
  sintering the metallic article to form a more dense metallic article while substantially retaining the geometry of the nonmetallic article.

25. The process of claim 24, wherein the dry pressing process comprises the steps of:
  spray-drying the starting materials to form a pressing powder; dry-pressing the pressing powder;
  delivering the pressing powder into a die cavity to form a nonmetallic article; before
  subjecting the nonmetallic article to a direct reduction process.

26. The process of claim 25, wherein the solvent comprises approximately 0–7 percent by weight of the pressing powder.

27. The process of claim 25, wherein the nonmetallic metal precursor shape has multiple open-ended channels.

28. The process of claim 25, wherein the nonmetallic metal precursor shape is in the form of a perforated structure.

29. The process of claim 25, wherein the dry-pressing step comprises uniaxially pressing the powder.

30. The process of claim 25, wherein the dry-pressing step comprises biaxially pressing the powder.

31. The process of claim 25, wherein the dry-pressing step comprises isostatically pressing the powder.

32. The process of claim 1, wherein the starting materials are formed into a shape by a slurry forming process.

33. The process of claim 32, wherein the slurry forming process comprises the steps of:
  forming a slurry of the starting materials;
  mixing the slurry;
  casting the slurry to produce a nonmetallic article with a certain geometry; before reducing the nonmetallic article to a metallic article with substantially the same geometry as the nonmetallic article.

34. The process of claim 33, wherein the water comprises approximately 10–40 percent by weight of the slurry.

35. The process of claim 33, wherein the mixing step comprises high energy milling.

36. The process of claim 33, wherein the nonmetallic metal precursor shape has multiple open-ended channels.

37. The process of claim 33, wherein the nonmetallic metal precursor shape is in the form of a honeycomb.

38. The process of claim 33, wherein the casting step comprises at least one of slip casting, tape casting, gel casting, and pressure casting.

39. The process of claim 1, wherein the chemical conversion step is direct reduction.

40. The process of claim 1, wherein the chemical conversion step is chemical decomposition.

41. A process for forming a shaped metallic article, comprising the steps of:
  combining starting materials, the starting materials comprising a nonmetallic metal precursor powder;
  forming the starting materials into a free standing, unsupported shape to produce a nonmetallic article of a certain geometry, wherein the nonmetallic metal precursor shape has a geometry chosen from one of multiple open-ended channels, multiple open-ended channels around the circumference of the shape and an interior core that is absent of material, and a honeycomb;
  chemically converting the nonmetallic article to a metallic article with a reducing agent while substantially retaining the geometry of the nonmetallic article; and
  sintering the metallic article to form a more dense metallic article while substantially retaining the geometry of the nonmetallic article.

42. The process of claim 41, further comprising the step of drying the nonmetallic article.

43. The process of claim 41, wherein the starting materials further comprise a binder and a solvent.

44. The process of claim 41, wherein the nonmetallic metal precursor powder is converted to the metal by a decomposition process.

45. The process of claim 41, wherein the nonmetallic metal precursor powder comprises at least one of an oxide of iron, an oxide of cobalt, an oxide of nickel, an oxide of copper, an oxide of molybdenum, an oxide of chromium, an oxide of niobium, an oxide of manganese, an oxide of titanium, an hydride of vanadium, and a hydride of zirconium.

46. The process of claim 45, wherein the iron oxide comprises hematite.

47. The process of claim 41, wherein the nonmetallic metal precursor powder comprises a mixture of the nonmetallic metal precursor powders to form a metal article with a composition of a multiple of elements.

48. The process of claim 41, wherein the binder is organic.

49. The process of claim 48, wherein the organic binder comprises at least one of: cellulose derivatives, gums, starches, polyvinyl alcohols, alginates, acrylamides, and acrylics.

50. The process of claim 41, wherein the binder is inorganic.

51. The process of claim 50, wherein the inorganic binder comprises: nano-particle oxide gels.

52. The process of claim 41, wherein the solvent is water.

53. The process of claim 52, wherein the water comprises approximately 10–40 percent by weight of the slurry.

54. The process of claim 53, wherein the water comprises approximately 20 percent by weight of the starting materials.

55. The process of claim 41, wherein the reducing step comprises: controlling reaction parameters of temperature, pressure, concentration of reactants and concentration of products.

56. The process of claim 41, wherein the reducing agent comprises at least one of: hydrogen, carbon monoxide, coal gas, fuel oils, carbon, and coke.

57. The process of claim 41, wherein the starting materials are formed into a shape by an extrusion process.

58. The process of claim 57, wherein the extrusion process comprises the steps of:
  extruding the paste into a nonmetallic metal precursor article with a certain geometry;

drying the nonmetallic metal precursor article;

removing the binder from the nonmetallic metal precursor article;

reducing the nonmetallic metal precursor article to a metallic article while substantially retaining the geometry of the nonmetallic metal precursor powder article;

sintering the metallic article to form a more dense metallic article; and heat-treating the dense metal shape.

59. The process of claim 58, wherein the removing of the binder step comprises heating the nonmetallic metal precursor powder.

60. The process of claim 58, wherein the nonmetallic metal precursor powder article is heated to 300–700° C. in order to remove the binder.

61. The process of claim 58, wherein the solvent comprises approximately 20% by weight of the starting materials.

62. The process of claim 41, wherein the starting materials are formed into a shape by a slurry forming process.

63. The process of claim 62, wherein the slurry forming process comprises the steps of:

forming a slurry of the starting materials;

mixing the slurry;

casting the slurry to produce a nonmetallic article with a certain geometry; before reducing the nonmetallic article to a metallic article with substantially the same geometry as the nonmetallic article.

64. The process of claim 63, wherein the mixing step comprises high energy milling.

65. The process of claim 63, wherein the casting step comprises at least one of slip casting, tape casting, gel casting, and pressure casting.

66. The process of claim 41, wherein the chemical conversion step is direct reduction.

67. The process of claim 41, wherein the chemical conversion step is chemical decomposition.

* * * * *